(12) United States Patent
Teng et al.

(10) Patent No.: US 9,403,501 B2
(45) Date of Patent: Aug. 2, 2016

(54) CARRIER SYSTEM AND METHOD THEREOF

(71) Applicant: MAGNA ELECTRONICS SOLUTIONS GMBH, Wetzlar (DE)

(72) Inventors: Chih-Wei Teng, Taipei (TW); Jiun-Shiung Chen, Taipei (TW)

(73) Assignee: MAGNA ELECTRONICS SOLUTIONS GMBH, Wetzlar (DE)

( * ) Notice: Subject to any disclaimer, the term of this patent is extended or adjusted under 35 U.S.C. 154(b) by 0 days.

(21) Appl. No.: 14/537,365

(22) Filed: Nov. 10, 2014

(65) Prior Publication Data

US 2015/0129343 A1 May 14, 2015

(30) Foreign Application Priority Data

Nov. 13, 2013 (CN) .......................... 2013 1 0573994

(51) Int. Cl.
*B60R 21/015* (2006.01)
*B60N 2/00* (2006.01)
*B60R 21/01* (2006.01)

(52) U.S. Cl.
CPC .......... *B60R 21/01534* (2014.10); *B60N 2/002* (2013.01); *B60R 2021/01088* (2013.01)

(58) Field of Classification Search
CPC combination set(s) only.
See application file for complete search history.

(56) References Cited

U.S. PATENT DOCUMENTS

| 1,523,495 A | 1/1925 | Silberman |
| 1,629,456 A | 5/1927 | Pellegrini |
| 1,684,499 A | 9/1928 | Mayer |
| 1,721,347 A | 7/1929 | Macrae et al. |
| 2,117,160 A | 5/1938 | Gale |
| 2,360,227 A | 10/1944 | Hemphill |
| 2,688,865 A | 9/1954 | Foster et al. |
| 2,760,050 A | 8/1956 | Porsche |
| 3,016,968 A | 1/1962 | Lenz et al. |
| 3,241,344 A | 3/1966 | Peters |
| 3,553,448 A | 1/1971 | Davis et al. |
| 3,582,639 A | 6/1971 | Chamberlain |
| 3,596,484 A | 8/1971 | Peters |
| 3,678,716 A | 7/1972 | Cobb |
| 3,759,556 A | 9/1973 | Wright |
| 3,766,539 A | 10/1973 | Bradshaw et al. |

(Continued)

FOREIGN PATENT DOCUMENTS

| DE | 2636099 | 2/1978 |
| DE | 3732936 | 9/1987 |

(Continued)

OTHER PUBLICATIONS

"Kit 62 Movement Detector Components", Sep. 24, 1994 p. 1-5.

(Continued)

*Primary Examiner* — Nicole Verley
(74) *Attorney, Agent, or Firm* — Gardner, Linn, Burkhart & Flory, LLP

(57) ABSTRACT

A carrier system includes at least one seat and a radio wave detection device. The radio wave detection device is configured to emit a detection wave towards at least one seat of the carrier. A reflected wave reflected in response to the detection wave is received by the radio wave detection device. A position of an occupied seat and a type of an occupant on the occupied seat are determined in response to the received reflected wave. A safety mechanism is activated in response to the position of the occupied seat and the type of the occupants.

15 Claims, 5 Drawing Sheets

(56) References Cited

U.S. PATENT DOCUMENTS

| | | |
|---|---|---|
| 3,829,693 A | 8/1974 | Schwarz |
| 3,839,640 A | 10/1974 | Rossin |
| 3,956,732 A | 5/1976 | Teich |
| 3,992,909 A | 11/1976 | McGhee |
| 4,007,955 A | 2/1977 | Kobayashi |
| 4,052,716 A | 10/1977 | Mortensen |
| 4,080,812 A | 3/1978 | Knott |
| 4,122,371 A | 10/1978 | Talmage et al. |
| 4,127,966 A | 12/1978 | Schmidt |
| 4,155,233 A | 5/1979 | Lira |
| 4,166,955 A | 9/1979 | Keller |
| 4,242,669 A | 12/1980 | Crick |
| 4,312,197 A | 1/1982 | Carrion et al. |
| 4,318,089 A | 3/1982 | Frankel et al. |
| 4,322,959 A | 4/1982 | Mochida |
| 4,342,210 A | 8/1982 | Denningham |
| 4,365,232 A | 12/1982 | Miller |
| 4,371,205 A | 2/1983 | Kaveney, Jr. |
| 4,379,971 A | 4/1983 | Smith et al. |
| 4,384,207 A | 5/1983 | Doctor |
| 4,418,335 A | 11/1983 | Genähr |
| 4,437,003 A | 3/1984 | Doctor |
| 4,441,023 A | 4/1984 | Doctor et al. |
| 4,464,649 A | 8/1984 | Her |
| 4,468,657 A | 8/1984 | Rossin |
| 4,482,179 A | 11/1984 | Johnson |
| 4,507,654 A | 3/1985 | Stolarczyk et al. |
| 4,546,417 A | 10/1985 | Watts |
| 4,556,796 A | 12/1985 | Renals |
| 4,604,524 A | 8/1986 | Kotlicki et al. |
| 4,612,442 A | 9/1986 | Toshimichi |
| 4,645,233 A | 2/1987 | Bruse et al. |
| 4,667,990 A | 5/1987 | Quantz |
| 4,697,081 A | 9/1987 | Baker |
| 4,704,533 A | 11/1987 | Rose et al. |
| 4,709,153 A | 11/1987 | Schofield |
| 4,745,284 A | 5/1988 | Masuda et al. |
| 4,746,910 A | 5/1988 | Pfister et al. |
| 4,752,768 A | 6/1988 | Steers et al. |
| 4,764,755 A | 8/1988 | Pedtke et al. |
| 4,775,347 A | 10/1988 | Takada et al. |
| 4,796,013 A | 1/1989 | Yasuda et al. |
| 4,797,657 A | 1/1989 | Vorzimmer et al. |
| 4,825,079 A | 4/1989 | Takamatsu et al. |
| 4,848,114 A | 7/1989 | Rippe |
| 4,848,509 A | 7/1989 | Bruhnke et al. |
| 4,857,912 A | 8/1989 | Everett, Jr. et al. |
| 4,868,390 A | 9/1989 | Keller et al. |
| 4,881,148 A | 11/1989 | Lambropoulos et al. |
| 4,895,009 A | 1/1990 | Kleefeldt et al. |
| 4,928,212 A | 5/1990 | Benavides |
| 4,930,864 A | 6/1990 | Kuster et al. |
| 4,933,668 A | 6/1990 | Oyer et al. |
| 4,952,808 A | 8/1990 | Turnbull et al. |
| 4,954,813 A | 9/1990 | August, Sr. et al. |
| 4,979,384 A | 12/1990 | Malesko et al. |
| 4,981,314 A | 1/1991 | Carr |
| 4,982,094 A | 1/1991 | Matsuda |
| 5,003,800 A | 4/1991 | Bublewicz |
| 5,027,104 A | 6/1991 | Reid |
| 5,030,012 A | 7/1991 | Hagins et al. |
| 5,045,702 A | 9/1991 | Mulleer |
| 5,054,686 A | 10/1991 | Chaung |
| 5,054,826 A | 10/1991 | Dow et al. |
| 5,063,371 A | 11/1991 | Oyer et al. |
| 5,071,160 A | 12/1991 | White et al. |
| 5,077,549 A | 12/1991 | Hershkovitz et al. |
| 5,084,696 A | 1/1992 | Guscott et al. |
| 5,093,656 A | 3/1992 | Dipoala |
| 5,166,679 A | 11/1992 | Vranish et al. |
| 5,174,643 A | 12/1992 | Priesemuth |
| 5,216,407 A | 6/1993 | Hwang |
| 5,219,413 A | 6/1993 | Lineberger |
| 5,231,359 A | 7/1993 | Masuda et al. |
| 5,276,772 A | 1/1994 | Wang et al. |
| 5,283,551 A | 2/1994 | Guscott |
| 5,297,010 A | 3/1994 | Camarota et al. |
| 5,317,620 A | 5/1994 | Smith |
| 5,349,329 A | 9/1994 | Smith |
| 5,383,703 A | 1/1995 | Irvine, III |
| 5,404,128 A | 4/1995 | Ogino et al. |
| 5,406,171 A | 4/1995 | Moody |
| 5,409,273 A | 4/1995 | Claar et al. |
| 5,424,711 A | 6/1995 | Müller et al. |
| 5,424,712 A | 6/1995 | Rosenberger |
| 5,424,718 A | 6/1995 | Müller et al. |
| 5,445,326 A | 8/1995 | Ferro et al. |
| 5,482,314 A | 1/1996 | Corrado et al. |
| 5,486,810 A | 1/1996 | Schwarz |
| 5,512,836 A | 4/1996 | Chen et al. |
| 5,525,843 A | 6/1996 | Höwing |
| 5,550,677 A | 8/1996 | Schofield et al. |
| 5,580,153 A | 12/1996 | Motz |
| 5,581,230 A | 12/1996 | Barrett |
| 5,585,625 A | 12/1996 | Spies |
| 5,636,536 A | 6/1997 | Kinnucan |
| 5,663,704 A | 9/1997 | Allen et al. |
| 5,670,935 A | 9/1997 | Schofield et al. |
| 5,680,096 A | 10/1997 | Grasmann |
| 5,693,943 A | 12/1997 | Tchernihovski et al. |
| 5,711,559 A | 1/1998 | Davis |
| 5,719,551 A | 2/1998 | Flick |
| 5,724,024 A | 3/1998 | Sonderegger et al. |
| 5,726,629 A | 3/1998 | Yu |
| 5,737,083 A | 4/1998 | Owechko et al. |
| 5,793,291 A | 8/1998 | Thornton |
| 5,796,094 A | 8/1998 | Schofield et al. |
| 5,802,479 A | 9/1998 | Kithil et al. |
| 5,805,056 A | 9/1998 | Mueller et al. |
| 5,808,552 A | 9/1998 | Wiley et al. |
| 5,848,802 A | 12/1998 | Breed et al. |
| 5,859,479 A | 1/1999 | David |
| 5,887,466 A | 3/1999 | Yoshizawa |
| 5,914,610 A | 6/1999 | Gershenfeld et al. |
| 5,933,090 A | 8/1999 | Christenson |
| 5,938,321 A | 8/1999 | Bos et al. |
| 5,949,340 A | 9/1999 | Rossi |
| 5,986,549 A | 11/1999 | Teodorescu |
| 6,018,292 A | 1/2000 | Penny, Jr. |
| 6,024,388 A | 2/2000 | Tomah et al. |
| 6,028,509 A | 2/2000 | Rice |
| 6,051,981 A | 4/2000 | Gershenfeld et al. |
| 6,067,019 A | 5/2000 | Scott |
| 6,086,131 A | 7/2000 | Bingle et al. |
| 6,091,322 A | 7/2000 | Ang et al. |
| 6,104,293 A | 8/2000 | Rossi |
| 6,130,614 A | 10/2000 | Miller et al. |
| 6,135,514 A | 10/2000 | Kowalewski et al. |
| 6,139,172 A | 10/2000 | Bos et al. |
| 6,166,625 A | 12/2000 | Teowee et al. |
| 6,209,933 B1 | 4/2001 | Ang et al. |
| 6,222,442 B1 | 4/2001 | Gager et al. |
| 6,254,261 B1 | 7/2001 | Bingle et al. |
| 6,275,146 B1 | 8/2001 | Kithil et al. |
| 6,335,687 B1 | 1/2002 | Terashima et al. |
| 6,339,376 B1 | 1/2002 | Okada |
| 6,349,984 B1 | 2/2002 | Marrazzo et al. |
| 6,356,854 B1 | 3/2002 | Schubert et al. |
| 6,390,529 B1 | 5/2002 | Bingle et al. |
| 6,460,906 B2 | 10/2002 | Bingle et al. |
| 6,480,103 B1 | 11/2002 | McCarthy et al. |
| 6,485,081 B1 | 11/2002 | Bingle et al. |
| 6,515,582 B1 | 2/2003 | Teowee et al. |
| 6,578,871 B2 | 6/2003 | Gray et al. |
| 6,587,770 B1 | 7/2003 | Gray et al. |
| 6,690,268 B2 | 2/2004 | Schofield et al. |
| 6,753,780 B2 | 6/2004 | Li |
| 6,768,420 B2 | 7/2004 | McCarthy et al. |
| 6,783,167 B2 | 8/2004 | Bingle et al. |
| 7,097,226 B2 | 8/2006 | Bingle et al. |
| 8,258,932 B2 | 9/2012 | Wahlstrom |
| 2006/0290518 A1 | 12/2006 | Bingle et al. |

(56) References Cited

U.S. PATENT DOCUMENTS

FOREIGN PATENT DOCUMENTS

| DE | 9006007 | 6/1991 |
|---|---|---|
| EP | 0235372 | 11/1986 |
| GB | 2252438 A | 8/1992 |
| GB | 2266799 A | 11/1993 |
| WO | WO 9739920 | 10/1997 |

OTHER PUBLICATIONS

International Search Report for corresponding International Application No. PCT/US05/42504, filed on Nov. 22, 2005.
Securaplane Technologies Product Information.
Supplementary European Search Report for corresponding European patent Application No. 05852083.4-1264/1817760, dated Mar. 26, 2010.

CARRIER SYSTEM AND METHOD THEREOF

This application claims the benefit of People's Republic of China application Serial No. 201310573994.1, filed Nov. 13, 2013, the subject matter of which is incorporated herein by reference.

BACKGROUND OF THE INVENTION

1. Field of the Invention

The invention relates to a carrier system and a method thereof, and in particular, to a carrier system utilizing a radio wave to determine the occupation state of a seat and a type of the occupant on the seat of a carrier.

2. Description of the Related Art

In vehicle design, occupants' safety, especially in driving, has always been an important topic. Most vehicles are equipped with a relevant safety mechanism for protecting the occupants in the vehicle in response to the situations, relevant to the occupants' safety, happened to the vehicle. For example, the safety mechanism will be activated to deliver an alert message, such as an audio alert message or an indicating light, to notify the occupants in the vehicle, when the occupants do not buckle-up the seatbelt completely or the doors of the vehicle are not closed completely.

The safety mechanism may further include a pressure detection system. The pressure detection system includes a pressure sensor disposed in a seat which is configured to determine, by sensing the occupant's weight on the seat, whether an occupant is on the seat. Therefore, the safety mechanism will be activated to enable an airbag in response to the occupied seat.

SUMMARY OF THE INVENTION

The invention discloses a carrier system and a method thereof. The system utilizes a radio wave to determine the occupation state and the type of the occupant on a seat of a carrier. Moreover, a safety mechanism is activated in response to the position of the occupied seat and the type of the occupant on the occupied seat to assure occupant's safety.

According to one embodiment of the present invention, a method implemented by a carrier system includes the steps: emitting a detection wave towards at least one seat of the carrier by a radio wave detection device, receiving a reflected wave reflected in response to the detection wave, determining a position of an occupied seat and a type of an occupant on the occupied seat in response to the received reflected wave and activating a safety mechanism in response to the position of the occupied seat and the type of the occupant.

According to another one embodiment, a carrier system includes at least one seat and a radio wave detection device. The radio wave detection device is configured to emit a detection wave towards the at least one seat and receive a reflected wave reflected in response to the detection wave, and determine a position of an occupied seat and a type of an occupant on the occupied seat in response to the reflected wave, and activate a safety mechanism in response to the position of the occupied seat and the type of the occupants.

The above and other aspects of the invention will become better understood with regard to the following detailed description of the preferred but non-limiting embodiment(s). The following description is made with reference to the accompanying drawings.

DETAILED DESCRIPTION OF THE INVENTION

The radar or radio frequency (RF) detection technology has been widely applied in fields such as reversing radar, motion sensor lighting device, or monitoring device. The radio waves used in the above fields include microwave, infra-red (IR) wave, ultrasonic or acoustic wave, electromagnetic wave, laser, and light wave. In microwave detection technology, for example, the frequency of an emitted detection wave is compared, by using the Doppler's principle, with that of the received wave. When an object moves in front of a sensor, a frequency difference of an emitted wave and a received wave is obtained in response to the movement of the object. For example, in the ultrasonic detecting technology, a detection wave is generated by a sensing device through a vibration with a specific frequency. A reflected wave is then reflected by an object as the emitted detection wave hitting the object is received by the sensing device. Moreover, the distance between the sensing device and the object is determined in response to a time of flight (TOF), which is a time elapsed from emitting a detection wave to receiving a reflected wave reflected in response to the detection wave.

Furthermore, with the development of radio wave detection technology, the state or the property of a designated target can be determined according to the signal or the wave reflected in response to the designated target. For example, a radio wave, which is capable of penetrating human body, is emitted towards a designated target and a signal reflected in response to the radio wave is examined according to the Doppler's principle. If the reflected signal includes characteristics relevant to the frequencies of human's heart beating or breathing, the designated target is determined as an occupant such as human beings.

Figure 1A:
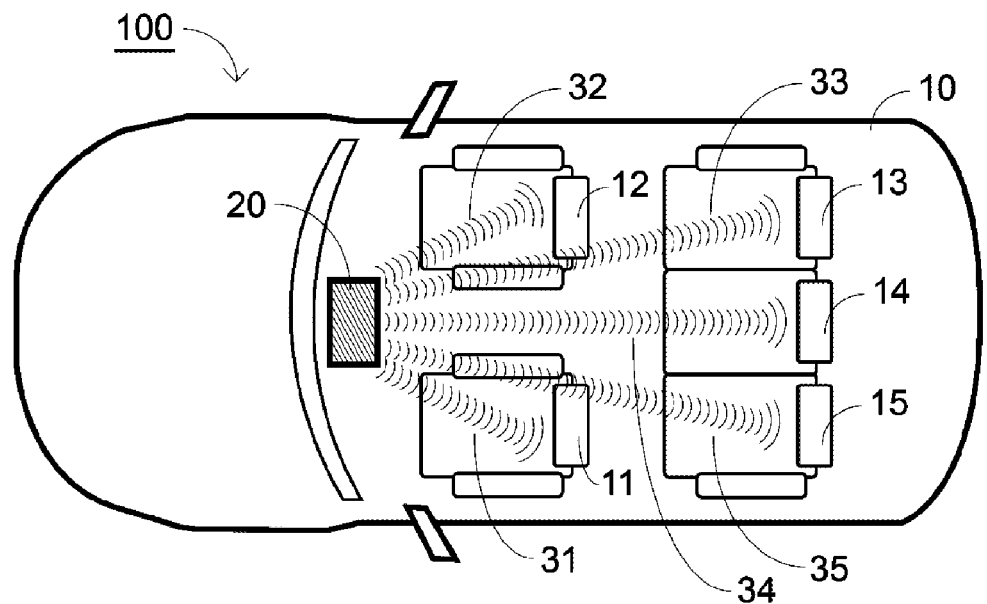
FIG. 1A is a schematic view of a carrier system installed in a carrier in one embodiment of the present invention.

FIG. 1A is a schematic view of a carrier system 100 in one embodiment of the present invention. As shown in FIG. 1A, the carrier system 100 is installed in a carrier 10 which includes at least one seat. Moreover, the carrier system 100 includes a radio wave detection device 20 configured to emit a detection wave towards the at least one seat 11-15 and receive a reflected wave reflected in response to the detection wave. A position of an occupied seat and a type of an occupant on the occupied seat are determined in response to a received reflected wave, and a safety mechanism is activated in response to the position of the occupied seat and the type of the occupants. In this embodiment, the carrier 10 includes a sedan. In some embodiments, the carrier 10 includes carriers in any means of transport.

The carrier system 100 of the present invention provides a contactless detection by utilizing a radio wave. In this embodiment, the radio wave detection device 20 is disposed, for example, under the roof of the carrier 10 embedded with the rear-view mirror, to detect the occupant seated on the at least one seat.

Figure 1B:
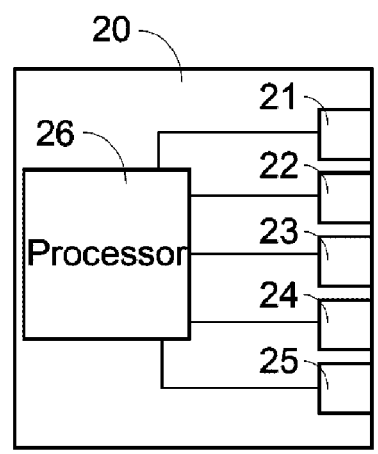
FIG. 1B is a function block diagram of a radio wave detection device in one embodiment of the present invention.

FIG. 1B is a functional block diagram of the radio wave detection device 20 in one embodiment of the present invention. As shown in FIG. 1B, the radio wave detection device 20 includes a processor 26 and a plurality of radio wave transceivers. In this embodiment, the radio wave detection device 20 includes five radio wave transceivers 21-25 which are respectively arranged in response to five seats 11-15 of the carrier 10. In other words, the five radio wave transceivers 21-25 respectively face toward the five seats 11-15. Each of the radio wave transceivers emits a detection wave towards a position of the seat and receives a reflected wave reflected in response to the detection wave. In some embodiments, each of the radio wave transceivers emits a detection wave towards the seat and receives a reflected wave reflected in response to the detection wave hit the seat.

In some embodiments, the number of the transceiver of the radio wave detection device 20 is not limited. Moreover, in still some embodiments, the number of the transceiver of the radio wave detection device 20 may not be equal to the number of the seats of the carrier. For example, a transceiver is capable of detecting all the targets within a detection range simultaneously. In still some embodiments, a transceiver is capable of detecting every target within the detection range sequentially in a mechanical rotation manner. Furthermore, in respect of the detection time, the one-to-one arrangement of the transceivers and the targets provides a way of parallel scanning. Moreover, the one-to-many arrangement of the transceivers and the targets provides a way of sequential detection.

Each of the radio wave transceivers 21-25 is electrically connected to the processor 26 and emits a detection wave under the control of the processor 26. Then, the processor 26 examines and determines the reflected waves received by each of the transceivers.

In this embodiment, first of all, the radio wave transceivers 21-25 of the radio wave detection device 20 respectively emit detection waves 31-35 towards the seats 11-15 of the carrier 10, as shown in FIG. 1A. The radio wave transceivers 21-25 of the radio wave detection device 20 respectively receive reflected waves (not illustrated) reflected in response to the detection waves 31-35.

Furthermore, the detection waves 31-35 may include different frequencies and amplitudes for different transmission distances of the designated targets. No matter the designated seat is occupied by an occupant or not, a reflected wave is reflected in response to the detection wave hit the seat or the occupant. Moreover, the reflected wave, reflected in response to the detection wave hit an occupant, includes characteristic frequencies different from that of the detection wave hit the seat.

Then, the processor 26 determines whether the reflected wave includes a characteristic frequency relevant to heart beating or breathing of the occupant. When the determined reflected wave does not include such characteristic frequencies, the seat is determined as an un-occupied state. In contrast, when the determined reflected wave includes such characteristic frequencies, the seat is determined as an occupied state. In this embodiment, the present invention is capable of detecting, by utilizing a radio wave, and determining whether a seat of the carrier is occupied. Since the frequency of heart beating and breathing is easy to be identified, the accuracy of the detection will be improved.

In order to avoid delivering unnecessary alert messages, in one embodiment of the present invention, a relevant safety mechanism of the carrier system 100 is activated only when an occupied state of the seat is confirmed. The safety mechanism, in some embodiments, includes delivering an alert message of buckling up seatbelt or using infant car seat. In some embodiments, the safety mechanism includes enabling an airbag in response to the occupied seat while an accident happens. Moreover, in still another embodiment of the present invention, the carrier system 100 is capable of determining a type of the occupant in response to the reflected position of the reflected wave and a relevant safety mechanism of the carrier system 100 is activated.

Figure 2:
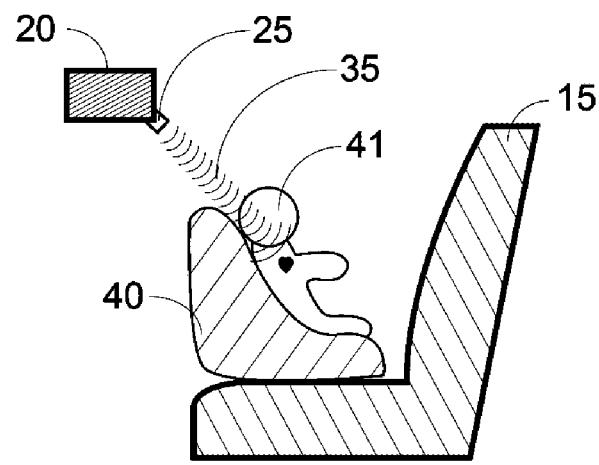
FIG. 2 is a schematic diagram of determining the type of the occupant in one embodiment of the present invention.

FIG. 2 is a schematic diagram of determining the type of the occupant in one embodiment of the present invention. As shown in FIG. 2, for example, a kid 41 is sitting in an infant car seat 40. In this embodiment, the infant car seat 40 includes a rear-facing and fixed on the seat 15. Since the occupant leans on the infant car seat 40 and faces toward a seatback of the seat 15, the reflected position of the reflected wave is a position of the infant car seat 40 when the detection wave 35 is emitted towards the seat 15.

Moreover, a distance between the radio wave detection device 20 and the seat 15 is defined as a pre-determined distance. In some embodiments, the pre-determined distance can be the distance between the radio wave detection device 20 and a seatback of the seat 15. Then, the processor 26 calculates a time of flight (TOF), a time elapsed from emitting a detection wave to receiving the reflected wave (not illustrated) reflected in response to the detection wave 35, for obtaining a detection distance. Therefore, in this embodiment, the detection distance is a distance between the radio wave detection device 20 and the kid 41, which can be used to determine the reflected position of the reflected wave.

Then, the processor 26 compares the detection distance with the pre-determined distance to determine the type of the occupant. When the detection distance is smaller than the pre-determined distance, as shown in FIG. 2, the type of the occupant is determined as a young child or an infant. In contrast, when the type of the occupant is an adult or an occupant then the occupant leans on the seatback. Therefore, the detection distance will be approximately equal to the pre-determined distance. The reflected wave will be reflected by the seatback of the seat.

In this embodiment, the radio wave transceivers of the radio wave detection device 20 are respectively arranged in response to the seats of the carrier 10. However, the present invention is not limited thereto and various modifications may further be made to above embodiment.

Figure 3:
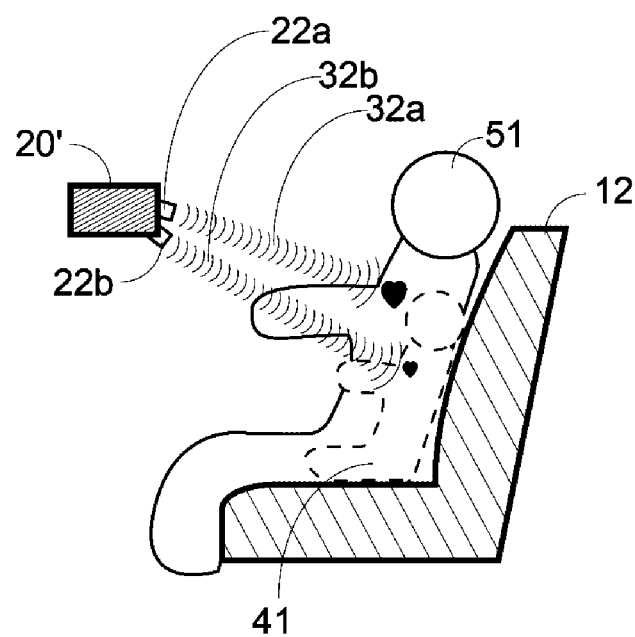
FIG. 3 is a schematic diagram of determining the type of the occupant in one embodiment of the present invention.

FIG. 3 is a schematic diagram of determining the type of the occupant in one embodiment of the present invention. As shown in FIG. 3, an occupant, for example, an adult 51, is sitting on a seat 12 of the carrier 10. In this embodiment, the radio wave detection device 20' includes a first radio wave transceiver 22a and a second radio wave transceiver 22b facing toward the seat 12 of the carrier 10. Moreover, the radio wave transceiver includes a narrow beam antenna which is able to emit a plurality of radio waves toward a pre-determined direction, for example, a vertical direction.

Furthermore, in order to improving the detection accuracy and enlarging the detection coverage, in some embodiments, the number of the radio wave transceiver is increased. Moreover, in some embodiments, the radio wave detection device 20' includes a rotating antenna which provides a way of detecting different positions in a predetermined direction. In other embodiments, the radio wave detection device 20' includes a rotating radio wave detection device which provides a way of detecting different positions in a predetermined direction.

As shown in FIG. 3, the first radio wave transceiver 22a and the second radio wave transceiver 22b are disposed at different reception beam angles for detecting the different occupants' height types. The first radio wave transceiver 22a is disposed in response to an adult, and the second radio wave transceiver 22b is disposed in response to a kid. Moreover, the reception beam angle of the radio wave transceiver is able to be adjusted in response to the different heights of the occupant.

Due to heights' differences, the reflected position of the reflected waves including characteristic frequencies relevant to human's physiological information, for example, heart beating or breathing, is different in response to the occupants' height. Therefore, the processor 26 is able to determine a type of the occupant in response to the reflected position of the reflected waves including physiological information.

As shown in FIG. 3, in this embodiment, a first detection wave 32a and a second detection wave 32b are simultaneously emitted toward the seat 12. Therefore, when an adult is sitting on the seat 12, a first reflected wave (not illustrated) including the physiological information, relevant to the reflected position of heart beating of the adult 51, will be received by the first radio wave transceiver 22a. Moreover, a second reflected wave (not illustrated) reflected in response to the second detection wave 32b will not include the physiological information and the reflected position of the adult. Furthermore, when a kid 41 is sitting on the seat 12, the first reflected wave (not shown) reflected in response to the first detection wave 32a will not include the physiological information. Meanwhile, the second reflected wave (not shown) including the physiological information and the reflected position, on the kid 41, of the second reflected wave will be received by the second radio wave transceiver 22b.

Figure 4:
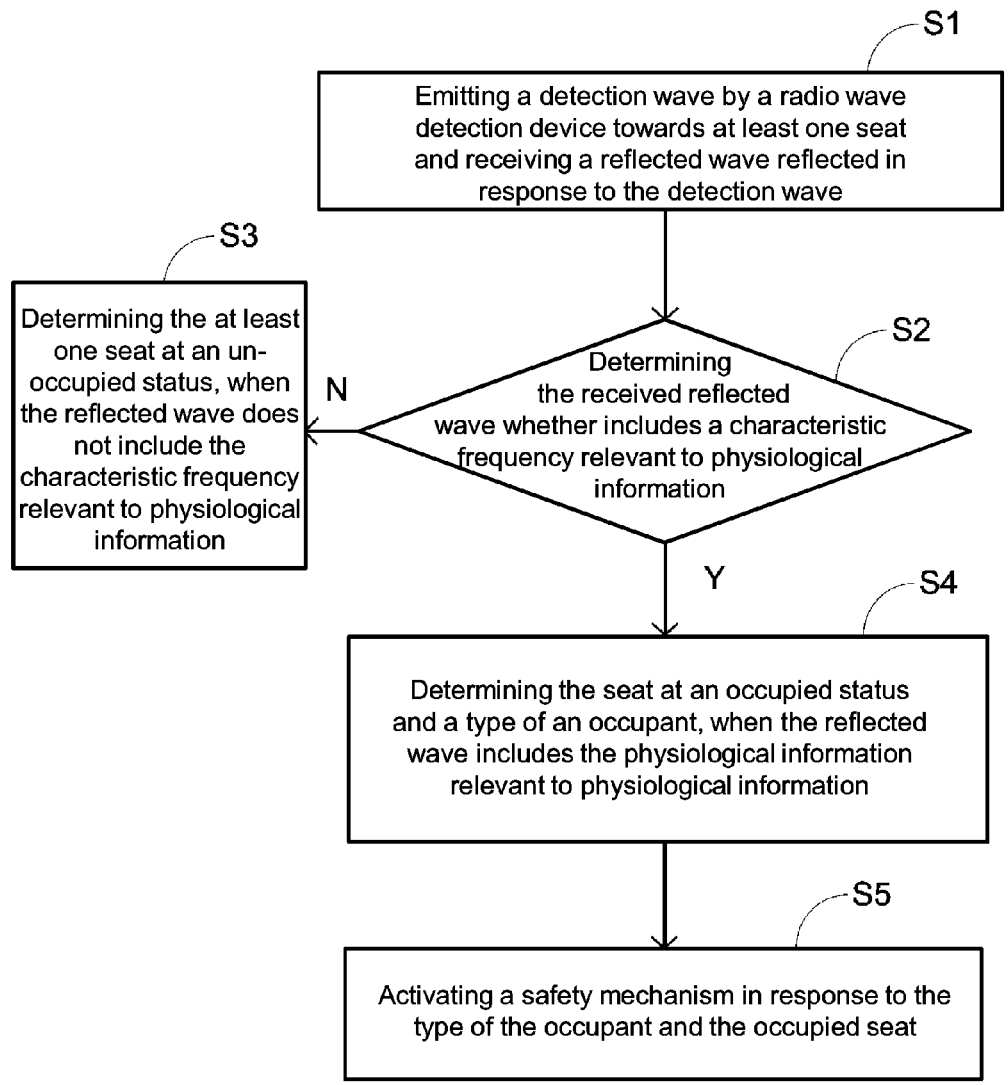
FIG. 4 is a flowchart of a method implemented by a carrier system in one embodiment of the present invention.

FIG. 4 is a flowchart of a method implemented by a carrier system in one embodiment of the present invention. As shown in FIG. 4, in step S1, a detection wave is emitted, by a radio wave detection device, toward at least one seat of a carrier and a reflected wave reflected in response to the detection wave is received. Next, in step S2, the received reflected wave is determined whether includes a characteristic frequency relevant to physiological information. In step S3, when the reflected wave does not include the characteristic frequency relevant to physiological information, the at least one seat is determined at an un-occupied status. In step S4, when the reflected wave includes the characteristic frequency relevant to physiological information, the seat is determined at an occupied status and seated by an occupant. A type of an occupant is then determined in response to the reflected position. Moreover, a position of an occupied seat is determined in response to the received reflected wave. In step S5, a safety mechanism is activated in response to the type of the occupant and the occupied seat.

Moreover, in one embodiment, the carrier may include a plurality of radio wave detection devices. The radio wave detection devices are respectively arranged to face a plurality of seats. In this embodiment, a radio wave detection device is arranged to face a seat. Therefore, the radio wave detection device is capable of detecting the seat and a safety mechanism is activated in response to the detected seat.

Figure 5:
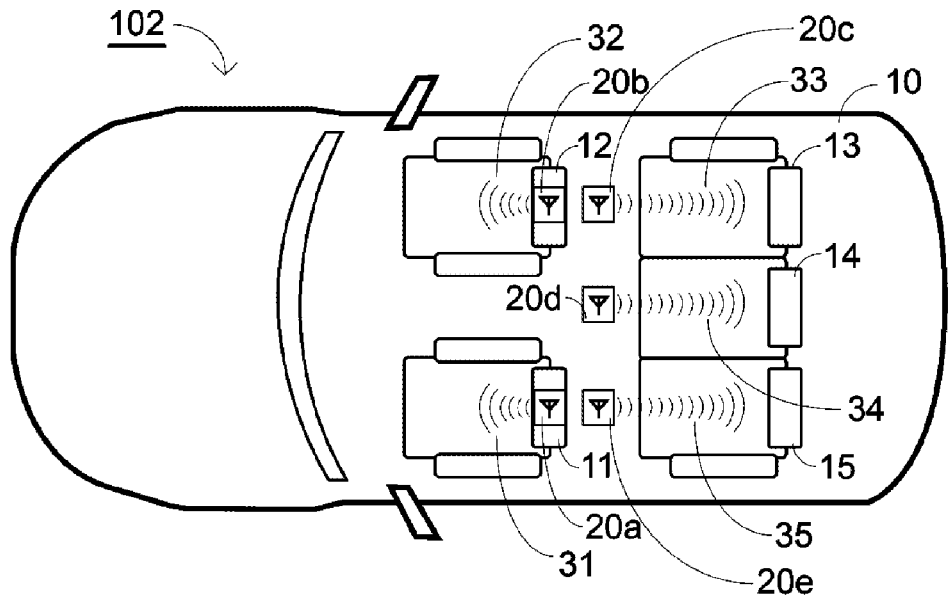
FIG. 5 is a schematic view of a carrier system in one embodiment of the present invention.

FIG. 5 shows a schematic view of a carrier system 102 in one embodiment of the present invention. As shown in FIG. 5, the carrier system 102 is similar to the carrier system 100 of FIG. 1 A but includes five radio wave detection devices 20a-20e. The five radio wave detection devices 20a-20e are respectively arranged in response to five seats 11-15 of the carrier 10. In some embodiments, the radio wave detection devices 20a and 20b are respectively disposed in the seatback of the seats 11 and 12. In other embodiments, the radio wave detection devices 20a and 20b are respectively disposed on the seatback of the seats 11 and 12. Moreover, as shown in FIG. 5, the radio wave detection devices 20a and 20b are configured to emit the detection waves 31 and 32 toward occupants seated on the seats 11 and 12. Furthermore, the radio wave detection devices 20c-20e are respectively arranged above the seats 13-15 to emit the detection waves 33-35 toward the occupants seated on the seats 13-15.

Figure 6:
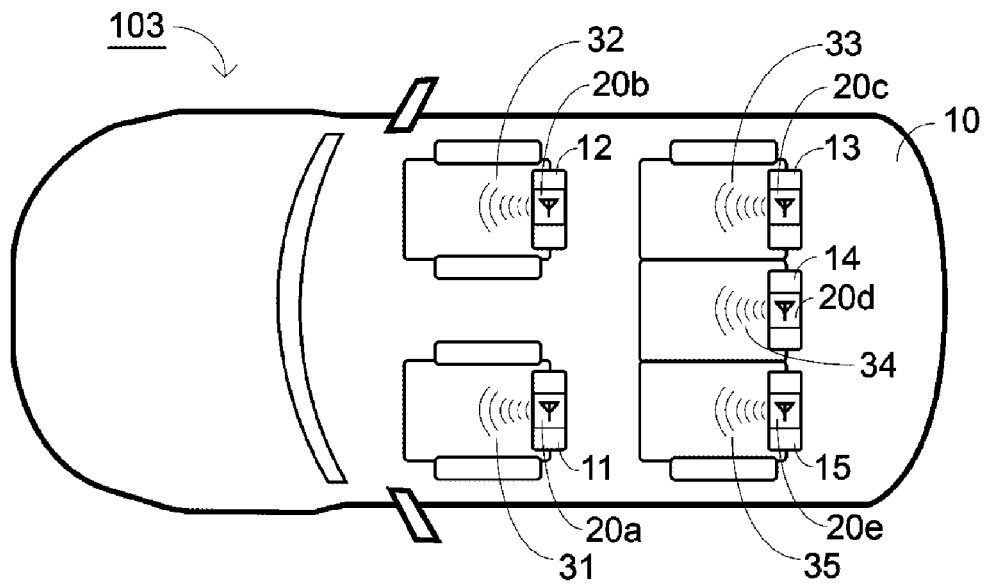
FIG. 6 is a schematic view of a carrier system in one embodiment of the present invention.

FIG. 6 is a schematic view of a carrier system 103 in one embodiment of the present invention. The carrier system 103 of FIG. 6, in some embodiments, is similar to the carrier system 102 of FIG. 5 but the radio wave detection devices 20a-20e are respectively disposed in the seatback of the seats 11-15. In other embodiments, the radio wave detection devices 20a-20e are respectively disposed behind the seatback of the seats 11-15. As shown in FIG. 6 the radio wave detection devices 20a-20e respectively emit the detection waves 31-35 towards the occupants seated on the seat 11-15.

Moreover, in some embodiments, each of radio wave detection devices includes a processor and a radio wave transceiver for raising up the detection accuracy. In other embodiments, for reducing the cost, a plurality of detection devices is coupled to at least one processor. Moreover, in still other embodiments, due to a number of the plurality of the detection devices is less than a number of the seats, the plurality of the detection devices is configured to respectively detect each of the seats in a rotation manner. In some embodiments, a plurality of radio detection devices is disposed above a seat. Therefore, the plurality of radio detection devices is capable of determining a type of occupants.

Figure 7:
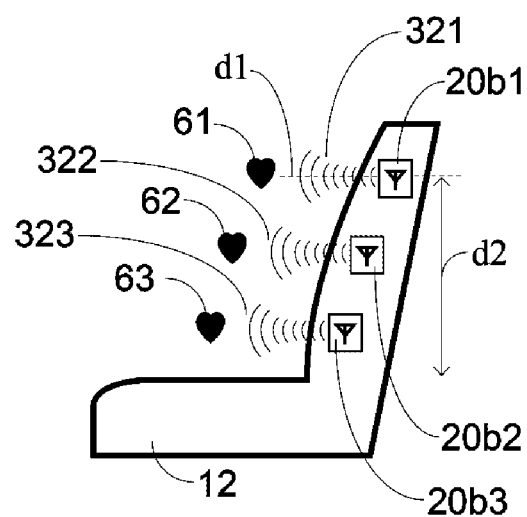
FIG. 7 is a schematic diagram of determining the type of the occupant in one embodiment of the present invention.

FIG. 7 shows a schematic view of determining a type of occupant in one embodiment of the present invention. As shown in FIG. 7, in this embodiment, a plurality of radio wave detection devices 320 to 323 is disposed alone a vertical direction in a seatback of the seat 12. Moreover, for example, an adult or a kid is sitting on the seat 12, and the hearts' positions 61-63 represent different occupants' height types. Next, three radio wave detection devices 20b1-20b3, disposed at different vertical heights, emit detection waves 321-323 respectively.

A detection distance d1 respectively represents a distance between the occupants' hearts 61-63 and the radio wave detection devices 20b1-20b3. A pre-determined distance d2 respectively represents a height at which the radio wave detection devices 20b1-20b3 disposed. Therefore, the detection distance d1 is determined in response to a time of flight (TOF). Moreover, the type of the occupant is determined in response the radio wave device which receives the reflected wave including information of heart beatings. In some embodiments, when an occupant is on the seat 12 and the radio wave detection device 20b1 received a reflected wave including information of heart beatings, the occupant is then determined as an adult.

Moreover, in some embodiments, when an occupant is on the seat 12 and the radio wave detection device 20b2 received a reflected wave including information of heart beatings and the distance d1 is shorter, compared with a predetermined distance, the occupant is determined as an infant car seat forward-facing disposed and an infant is seated in the infant car seat.

In summary, the present invention discloses a carrier system for determining, by a radio wave, the occupation state of a seat of a carrier. The carrier system provides a contactless detection which considerably reduces the disposition cost and maintenance cost of the detection device. In some embodiments, when a young child is not sitting in an infant car seat, or the young child is sitting at a front seat or the infant car seat is placed at the front seat, an alert message is delivered to warn the driver. When an infant car seat is disposed on a rear seat, the airbag relevant to the rear seat can be disabled to prevent damages made by an air bag explosion. Moreover, when an adult is sitting on a seat of the carrier, the adult will receive an alert message, such as buckling the seatbelt, will be delivered to the adult.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A carrier including a carrier system, comprising:
   at least one seat;
   a radio wave detection device configured to emit a detection wave towards the at least one seat and receive a reflected wave reflected in response to the detection wave, and determine a position of an occupied seat and a type of an occupant on the occupied seat in response to the reflected wave, and activate a safety mechanism in response to the position of the occupied seat and the type of the occupants;
   wherein the radio wave detection device includes at least one radio wave transceiver facing toward the at least one seat, and the radio wave transceiver is configured to emit the detection wave towards a pre-determined position of the at least one seat and receive the reflected wave reflected by the pre-determined position of the at least one seat; and
   wherein the at least one radio wave transceiver moves in a rotational manner to detect the at least one seat.

2. The carrier of claim 1, wherein the safety mechanism is configured to deliver an alert message or activate at least one airbag when an accident occurs.

3. The carrier of claim 1, wherein the radio wave detection device comprises a processor configured to determine whether the reflected wave includes a characteristic frequency in response to heart beating or breathing of the occupant.

4. The carrier of claim 3, wherein the processor configured to obtain a detection distance by calculating a time of flight (TOF) between the detection wave and the reflected wave, and map the detection distance with a pre-determined distance between the radio wave detection device and the occupied seat.

5. The carrier of claim 1, wherein the at least one radio wave transceiver is disposed in response to different reception beam angles.

6. The carrier of claim 1, wherein the radio wave detection device is disposed above the at least one seat.

7. The carrier of claim 1, wherein the radio wave detection device is disposed in front of the at least one seat.

8. A carrier including a carrier system, comprising:
   at least one seat;
   a radio wave detection device having a radio wave transceiver configured to emit a detection wave towards the at least one seat and receive a reflected wave reflected in response to the detection wave, the radio wave detection device configured to determine a position of an occupied seat and a type of an occupant on the occupied seat in response to the reflected wave, and activate a safety mechanism in response to the position of the occupied seat and the type of the occupants;
   wherein the at least one radio wave transceiver is disposed in response to different reception beam angles; and
   wherein the at least one radio wave transceiver moves in a rotational manner to detect different positions, along a vertical direction, of the at least one seat.

9. The carrier of claim 8, wherein the radio wave transceiver is configured to emit the detection wave towards a pre-determined position of the at least one seat and to receive the reflected wave reflected by the pre-determined position of the at least one seat.

10. The carrier of claim 9, wherein the at least one radio wave transceiver moves in a rotational manner to detect the at least one seat.

11. The carrier of claim 8, wherein the safety mechanism is configured to deliver an alert message or activate at least one airbag when an accident occurs.

12. The carrier of claim 8, wherein the radio wave detection device comprises a processor configured to determine whether the reflected wave includes a characteristic frequency in response to heart beating or breathing of the occupant.

13. The carrier of claim 8, wherein the processor configured to obtain a detection distance by calculating a time of flight (TOF) between the detection wave and the reflected wave, and map the detection distance with a pre-determined distance between the radio wave detection device and the occupied seat.

14. The carrier of claim 8, wherein the radio wave detection device is disposed above the at least one seat.

15. The carrier of claim 8, wherein the radio wave detection device is disposed in front of the at least one seat.

* * * * *